(12) United States Patent
Norrman et al.

(10) Patent No.: US 12,477,276 B2
(45) Date of Patent: Nov. 18, 2025

(54) SYSTEM AND METHOD FOR MEDIA DISTRIBUTION

(71) Applicant: Axis AB, Lund (SE)

(72) Inventors: Fredrik Norrman, Lund (SE); Magnus Rolf, Lund (SE); Magnus Rosell, Lund (SE)

(73) Assignee: Axis AB, Lund (SE)

( * ) Notice: Subject to any disclaimer, the term of this patent is extended or adjusted under 35 U.S.C. 154(b) by 323 days.

(21) Appl. No.: 18/193,832

(22) Filed: Mar. 31, 2023

(65) Prior Publication Data

US 2023/0370775 A1   Nov. 16, 2023

(30) Foreign Application Priority Data

May 11, 2022 (EP) ..................................... 22172829

(51) Int. Cl.
*H04R 3/00* (2006.01)
*G06F 3/16* (2006.01)
*H04R 3/12* (2006.01)

(52) U.S. Cl.
CPC .............. *H04R 3/12* (2013.01); *G06F 3/165* (2013.01)

(58) Field of Classification Search
CPC .................................. H04R 3/12; G06F 3/165
See application file for complete search history.

(56) References Cited

U.S. PATENT DOCUMENTS

| 7,945,636 B2 | 5/2011 | Nelson et al. |
| 2003/0021717 A1 | 1/2003 | Harris |
| 2008/0086379 A1 | 4/2008 | Dion et al. |
| 2012/0284802 A1 | 11/2012 | Hierro et al. |
| 2013/0097558 A1 | 4/2013 | Lichtenstein |
| 2014/0304367 A1 | 10/2014 | Fletcher |
| 2021/0006922 A1 | 1/2021 | Swaminathan et al. |

FOREIGN PATENT DOCUMENTS

WO   2021/008481 A1   1/2021

OTHER PUBLICATIONS

Extended European Search Report dated Oct. 6, 2022 for European Patent Application No. 22172829.8.

*Primary Examiner* — Rasha S Al Aubaidi
(74) *Attorney, Agent, or Firm* — Volpe Koenig

(57) ABSTRACT

A method for distributing an audio instruction from a manager site at a client site in a distributed audio system having a plurality of client sites, a generalized audio instruction for playback of audio at the client sites is received via user input at the manager site. The generalized audio instruction includes a plurality of labels which are global in the audio system and are indicative of a time schedule category, an audio zone category, and an audio source category. Pre-defined information which associates the plurality of labels indicative of the time schedule, audio zone, and audio source categories with client site specific identifiers of a time schedule, an audio zone, and an audio source, respectively, is accessed for each of client sites. The generalized audio instruction is adapted using the pre-defined information to generate a specialized audio instruction for each of the one or more client sites.

20 Claims, 3 Drawing Sheets

SYSTEM AND METHOD FOR MEDIA DISTRIBUTION

FIELD OF INVENTION

The present invention generally relates to the field of media distribution and in particular to a method and system for distribution of audio instructions from a manager site to a client site.

BACKGROUND

The use of background music and audio announcement in retail is well established. The current state of the art within music streaming has made it possible for most people to generate playlists with relative ease, at least in the private realm. For a retail chain, however, and in a commercial context, the situation may be slightly more complicated. The retail chain may include branches in different parts of a country or even in different countries, and stores in the branch may be directed towards different customer segments or contain different departments. A straightforward example is a retail chain within clothing. The chain may have stores in different countries on different continents. Each store may contain clothes for men, women, teenagers, and children, distributed into different parts of the store. The taste in music will differ between countries, continents and generations, and the retail chain would like to accommodate this differing taste, and also add a mix of public announcement that should be directed towards all or some of the expected listeners. The type of music and what it communicates should be within the values of the retail chain, and local rules and regulations regarding royalties should be honored.

This makes it difficult for a central location to arrange audio lists for all stores, meaning that this is mostly done in the individual store and is subject to the discretion of the local staff. This is time consuming for the local staff and makes it difficult for the retail chain to ensure that all conditions are met, particularly with respect to company values and royalties.

Part of the problem, and part of the solution, is presented in U.S. Pat. No. 7,945,636, which relates to a "multi-tier enterprise level application" for delivering customizable music and advertisements to remote retail locations. The solution presented, however, lacks the flexibility and adaptability that is desired, and the present disclosure therefore aims at providing an improved method.

SUMMARY

Further features of, and advantages with, the present disclosure will become apparent when studying the appended claims and the following description. The skilled addressee realize that different features may be combined to create embodiments other than those described in the following, without departing from the scope of the present claims.

According to a first aspect thereof, the present disclosure provides a method according to claim 1. According to a second aspect the present disclosure provides a device according to claim 10. Further embodiments of the are disclosed in the dependent claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

A good starting point for understanding the present disclosure is to first observe it from the perspective of the object to be achieved. Following that, the nodes, e.g., a manager site and a client site, will be described, followed by the flow from the manager site the client site(s). As always, the following description is connected to one or more specific embodiments, and several alternatives or generalizations may be done without inventive activity.

Figure 1:
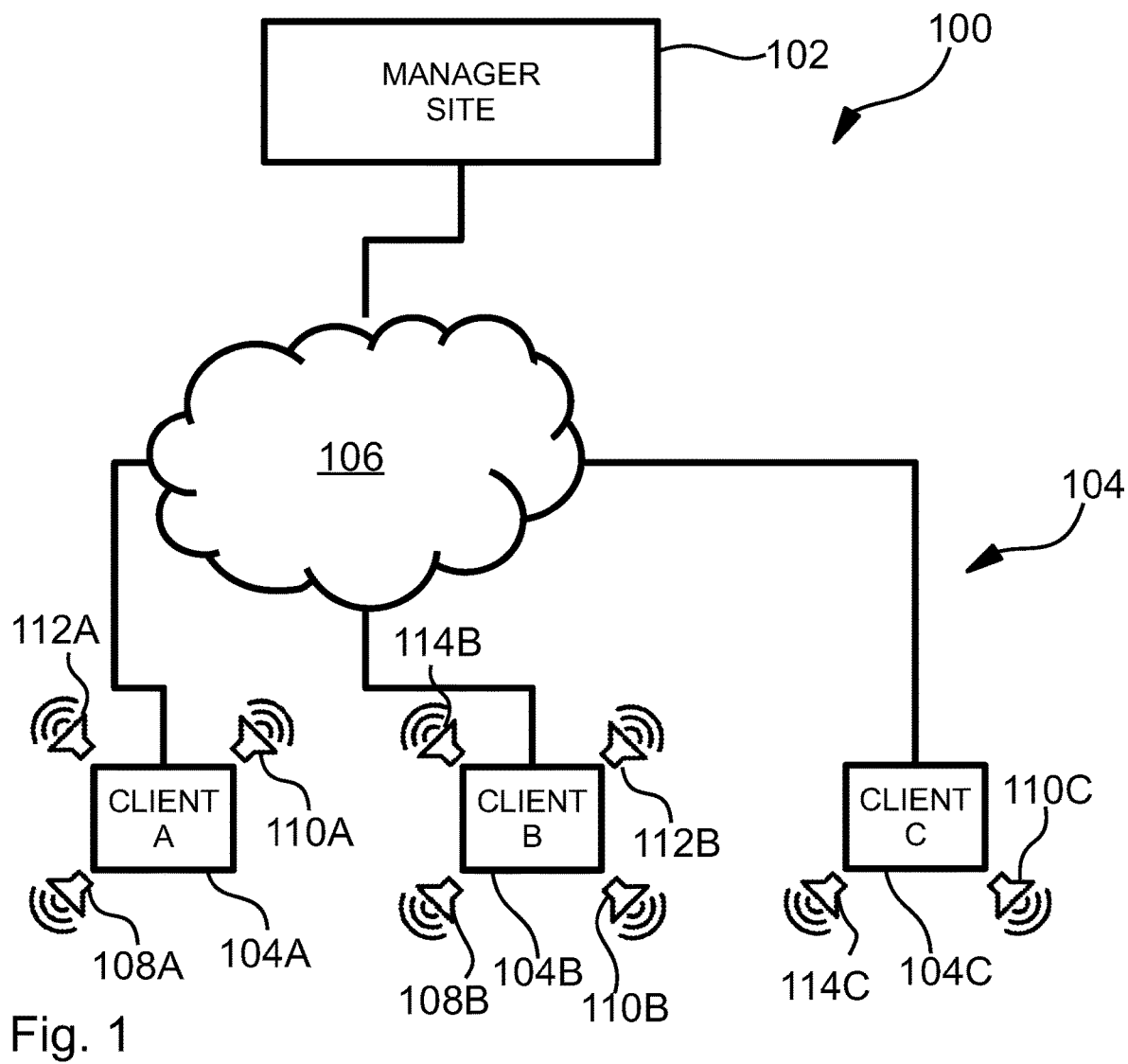
FIG. 1 conceptually illustrates a distributed audio system comprising a manager site and a plurality of client sites according to embodiments.

FIG. 1 shows a system 100 where embodiments of the present disclosure could be operational. FIG. 1 is a schematic of a manager site 102 and three client sites 104A, 104B, and 104C connected to the manager site 102 via a network 106, such as the internet. The system 100 can be managed from a device at the manager site 102. As will be explained, this includes making settings of the client sites 104-A-C, defining labels which are global in the audio system, and generating audio instructions for playback of audio at one or more of the client sites 104A-C. Each client site 104A-C is associated with a site identifier by which the manager site 102 can address the client site 104A-C. The identifier may, e.g., be in the form of a number or a name of the client site. The client sites 104A-C are remote from the manager site 102 and may be located in different parts of a country, in different countries, or on different continents. Typically, however, they belong to the same chain of stores, the same organization, or similar, i.e., circumstances where there could be a benefit in streamlining the distribution of audio, e.g., for the reasons mentioned in the background section. Each client site contains a number of audio zones 108, 110, 112, 114 (annotated with A, B, and C, respectively), each speaker symbol indicating an individual audio zone. Each audio zone 108, 110, 112, 114 at a client site is associated with a local identifier by which a local control unit (CU in FIG. 2) at the client site can address the audio zone 108, 110, 112, for example for playing music in the audio zone. An audio zone typically consists of one or more (active IP) speakers and may be represented by a collection of MAC adresses. The identifier of the audio zone may be a unique identifier (UID) of the collection of MAC addresses.

The object to be achieved is to enable for an operator at the managing site 102 to distribute audio or rather an audio instruction that is tailormade for each client site 104A-C, while minimizing the necessary effort.

This is realized, which will be detailed in the following paragraphs, by an operator building a generalized audio instruction at the manager site 102, which is sifted through a local filter adjusting the generalized audio instruction to a tailormade, specialized, audio instruction for the client sites 104A-C. The result is that specific audio is played in targeted individual zones 108-114 of each targeted individual site. As will be described hereinafter, it will also result in that a schedule included in the audio instruction is adapted to the local opening hours, as well as other locally defined preferences. By an audio instruction being "specialized" is meant that it includes instructions which are directly applicable at a specific client site. Specifically, the instructions may be interpretable to the client site, thereby allowing the instructions to be carried out. By an audio instruction being "generalized" is meant that it includes instructions that concern one or more client sites, but where the instructions are not directly applicable or interpretable at a specific client site. Specifically, the instructions in the generalized audio instruction are expressed on a higher level of generality than the instructions in the specialized audio instruction, and therefore needs to be adapted for each client site in order for them to be interpretable at the client site. By way of example, the generalized audio instruction may be expressed in terms of a category of an audio zone or an audio source, while the specialized audio instruction may include an identifier of an audio zone or an audio source at the client site.

Notably, as illustrated in FIG. 1, the different client sites include a various number of zones 108-114. In a practical situation, where the client sites are associated in some organizational way, some of the zones will be overlapping in the sense that at least some zones at different client sites will correspond to a same audio zone category, such as a similar type of site area. The example from the background section, pertaining to a retail chain where site areas with clothes for different ages or genders may be the zones, is one example that is easy to grasp. That is the example that will be used as an example herein, yet the skilled person will undoubtedly understand that as long as there are multiple sites, where each site has multiple zones, the invention could be useful.

Figure 2:
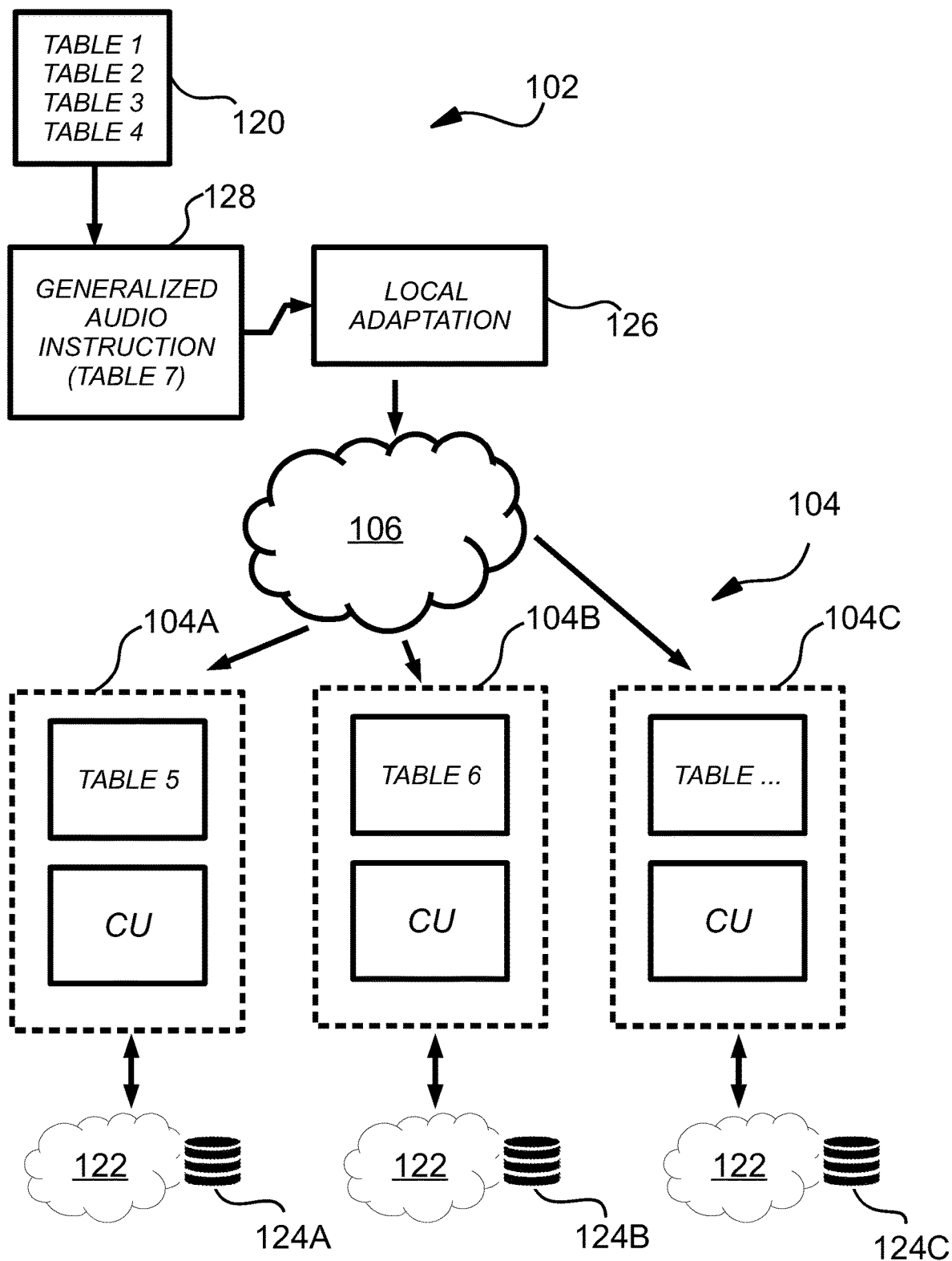
FIG. 2 illustrates one embodiment.

The following will more detail regarding the particulars of the present invention, starting with the manager site 102 from where the framework of the system is controlled. Referring to FIG. 2 which should be read in conjuction with the tables to follow, the manager site 102 will be configured to include several sets of labels 120. These labels are global in the audio system, meaning that they are common to the whole audio system 100. Some labels may be pre-existing in software, but as a rule a user-interface will include the possibility for an operator to add labels (or tags) as well as various logical abstractions of labels (including groups of labels). Examples of this are described in Tables 1-4 below.

TABLE 1

| Time Label |
| --- |
| #Working hours |
| #Non-working hours |
| #Christmas |
| #Cinco de Mayo |
| . . . |

TABLE 3

| Zone Label | |
| --- | --- |
| #Men | #Clothing |
| #Women | |
| #Kids | |
| #Teen | |
| #Restaurant | |
| #Lobby | |

TABLE 2

| Site Label | | |
| --- | --- | --- |
| #Stockholm - City Center | #Stockholm | #Sweden |
| #Stockholm - Seaside | | |
| #Gothenburg | | |
| #New York | #USA | #English speaking |
| #London | #UK | |

TABLE 4

| Source Label |
| --- |
| #Rock |
| #Ambient |
| #Kids |
| #Easy listening |
| #Top list |
| #POP |

There is a time label (Table 1) which is indicative of a time schedule category and enables the creation of a time schedule. The time schedule typically defines when audio should be played, defined in general terms. As an example, working hours may differ between different client sites, but this general instruction will be specified later on.

There is also a label indicating the location of a client site, the "site label" illustrated in Table 2. The smallest building block for each site label is the name or identifier of an individual client site. These building blocks may however be assembled according to different criteria to form site labels for categories of client sites. An example of this is that in Table 2, two sites in Stockholm are defined, representing stores at two different locations in the city of Stockholm. These two stores have in common that they are located in Stockholm, so it may make sense from an organizational standpoint to have a label including all sites in Stockholm (see #Stockholm in Table 2). Together with the store in Gothenburg, which is found as a separate label, they represent the stores available in Sweden, and for the purposes of being able to select all stores in Sweden they are all collected under the label #Sweden (also shown in Table 2).

The abstraction levels do not have to be dictated by geography. The sites in New York and London may be clustered under the label #Englishspeaking, in the same way that sites in different countries of Europe could be clustered under #Frenchspeaking, #Germanspeaking, etc., and basically any combination that makes an organizational sense within the context of audio distribution. Accordingly, the client sites may be grouped into site categories depending on different parameters, such as region, country, continent, languague, organizational branch, etc.

At the manager site 102, labels referring to audio zone categories (Table 3) and audio source categories (Table 4) will also be managed. The zone labels are business related and site related and reflect different categories of audio zones, such as the different areas present at a client site. The source labels represent different categories or types of audio, such as different genres of music. For ease of use, these zone labels and source labels should be self-explanatory.

As viewed from the perspective of the client site 104A-C, the labels 120 (Tables 1-4) defined at the manager site 102 will be available for selection at the client sites 140A-C. As will now be explained, information which associates the labels 120 with client site specific data in terms of identifiers of locally defined time schedules, audio zones, and audio sources may be generated for each client site 104A-C.

In an installation phase, the operator at the client site will cluster available speakers into zones (108-114 in FIG. 1). Each zone may have an local identifier which may be in the form of a number or a name, e.g., "Customer cafeteria" but will then be associated with an available zone label, e.g., "#Restaurant" by the client site operator.

The client site operator will also populate available source labels, e.g., associate #Ambient to an identifier of an audio source of his or her liking, suitable for the local client site in terms of language or style, etc. The operator at the client side will thus be able to define what audio source identifier to be associated with the label #Ambient. The audio source may be one or more of a user defined playlist stored locally 122 or remotely 124, such as a link to a streaming service, a digital music service, a radio station, a remote or local music library, etc. Accordingly, a source label may be associated with different audio sources at different client sites 104A-C. In this way the audio will be locally tailor-made for the intended audience, which may correspond to the top list for the relevant country or region or age category, etc.

At the client site 104 information concering local time schedules, such as the opening hours (i.e., a week or year schedule of opening hours), local time etc. may be added by the client site operator or automatically assembled by the system from client site data, whichever is more convenient. This item of information may be, named (locally) with an identifier, and also associated with a centrally defined label, i.e., a time label. In this way, a chain ranging from the time labels defined at the manager site 102 may be associated with specific local time schedules that apply at the individual client sites 104A-C. The local time schedules may each be represented by an identifier, such as a local name of the time schedule. The same is true for the site label, which most likely will have been set as the client site 104 is added to the system from the manager site 102. Abstractions of labels may generally only be available at the manager site.

For the purpose of illustration, an example of information generated for two client sites is shown in Tables 5 and 6 below. Here the settings for the two Stockholm sites are summarized. Notably, as for all the other examples, the tables are merely a convenient manner in which to present the information. An actual interface for collecting the information, or a system for storing and transferring the information may be embodied in any suitable way. Typically, the client site interface would be in the form of a client site manager application, containing all necessary tools for managing the site locally and independently of the central manager site, and also capable of receiving and implementing the detailed instructions from the manager site, and thereby effecting the audio instructions.

TABLE 5

| Stockholm - City Center | |
|---|---|
| Times | Label |
| Mon-Fri 10-20<br>Sat-Sun 11-18 | #WORKING-<br>HOURS |
| Zones | Label |
| Kid's Dept<br>Women's Dept<br>Cashier | #KIDS<br>#WOMEN<br>#POS |
| Sources | Label |
| Sweden Top 50<br>Astrid Lindgren Classic<br>Easy Listening playlist<br>. . . | #POP<br>#KIDS<br><br>#AMBIENT<br><br>. . . |

TABLE 6

| Stockholm - Seaside | |
|---|---|
| Times | Label |
| Mon-Fri 12-18<br>Sat-Sun 8-12 | #WORKING-<br>HOURS |
| Zones | Label |
| Youngsters<br>Adults<br>Punto de Venta | #KIDS<br>#JAZZ<br>#POS |
| Sources | Label |
| Hits for kids<br>El Rock!<br>Ultimate Jazz Radio<br>. . . | #KIDS<br>#POP<br>#JAZZ<br>. . . |

The information regarding local working hours, under the heading "Times" could conveniently be entered at the client site by using a calendar-format user interface. This is a straighforward and recognizable manner for adding opening and closing times for each day of the week, for groups of days (such as Mon-Fri, or Weekend, etc), as well as adding information concerning local or national holidays, or other days with deviating working hours. The zone identifiers (under the heading "Zones") are simply text strings with names familiar to an operator of a client site, and will be associated with speaker groups at the client site. Also, the audio sources named under the heading "Sources" will ultimately contain an association to an audio source added by the client site operator.

When the information concerning associations between the labels 120 and client site specific data has been assembled at the client sites 140A-C, it may be stored in the audio system 100 as pre-defined information. For instance, it may be uploaded to the manager site 102, stored locally on the client sites 104A-C, or on a remote server. For the purposes of the present description, the pre-defined information is uploaded to the manager site 102 (or the manager site control application) to enable the local adaptation 126. The local adaptation could also be performed at the client site 102 (or the client site control application), but having it available at the manager site 102 is considered more convenient since that means that all information necessary for generating specialized audio instructions from a generalized audio instruction will be available at a single location or at least within a single application.

Referring again to FIG. 2, an operator connected to the manager site 102 may prepare an input a generalized audio instruction 128. The generalized audio instruction is expressed in terms of a plurality of labels selected from the set of labels 120. Specifically, the generalized audio instruction 128 may include a site label, a time label, an audio zone label, and an audio source label. As explained above, these are indicative of a client site category, a time schedule category, an audio zone category, and an audio source category, respectively. Accordingly, the general audio instruction defines in general terms when to play audio, where to play audio, and what audio to play. Continuing with the example above, the generalized audio instruction 128 could be summarized as:

TABLE 7

| Parameters | Label |
|---|---|
| Time | #WORKING HOURS |
| Sites | #STOCKHOLM |
| Target zones/source | #KIDS/#KIDS |
| Target zones/source | #WOMEN/#POP |
| Target zones/source | #MEN/#POP |

This generalized audio instruction 128 will be subject to local adaptation 126, where it is co-processed with the local preferences, the pre-defined information, to generate the specialized audio instruction. During this process, each label in the generalized audio instruction 128 is processed (or translated) to local, client specific, identifiers using the associations in the pre-defined information, as exemplified in tables 5 and 6. The effect is that each client site will receive a tailormade (or specialized) audio instruction which can then be implemented at the client site. The result using the particulars of the illustrated example will be that the City Center site will play "Best of Astrid Lindgren" in the Kid's Department and "Sweden Top 50" in the Women's Department, this will be performed during the defined working hours. At the Seaside site "Ultimate Jazz Radio" will be played in the Adults-area while the playlist "Hits for kids" will be heard in the Youngsters-area. Notably, the operator at the manager site will not have to bother about local preferences or prepare a detailed playlist, since this will be accounted for at the client site.

In any client site 104A-C the schedule may include the addition of advertisements at regular or irregular intervals. An #ADV-label may also be populated locally in the pre-defined information, or transferred (e.g., downloaded or streamed) from a central storage in case it relates to a coordinated campaign. Furthermore, the schedule may include public announcements, such as a closing announcement ("The store is now closing in 15 minutes") in which case the announcement may be scheduled to in relation to a time schedule being associated with the time label in the general audio instruction 128. For example, the general audio instruction 128 may specify that audio should be played at "closing time minus 15 minutes". The closing announcement, as well as any other public announcement, may be selected locally in the pre-defined information and thereby be specific to a particular client site. Both opening time and closing time are specified in the client site preferences (under "working hours"), so the relative time "closing time minus 15 minutes" will be translated to an absolute time without any additional work performed by a client site operator. The schedule as a whole will also be given a time stamp in relation to the working hours at the client site, and in this way different opening hours and time zones will be conveniently handled.

Figure 3:
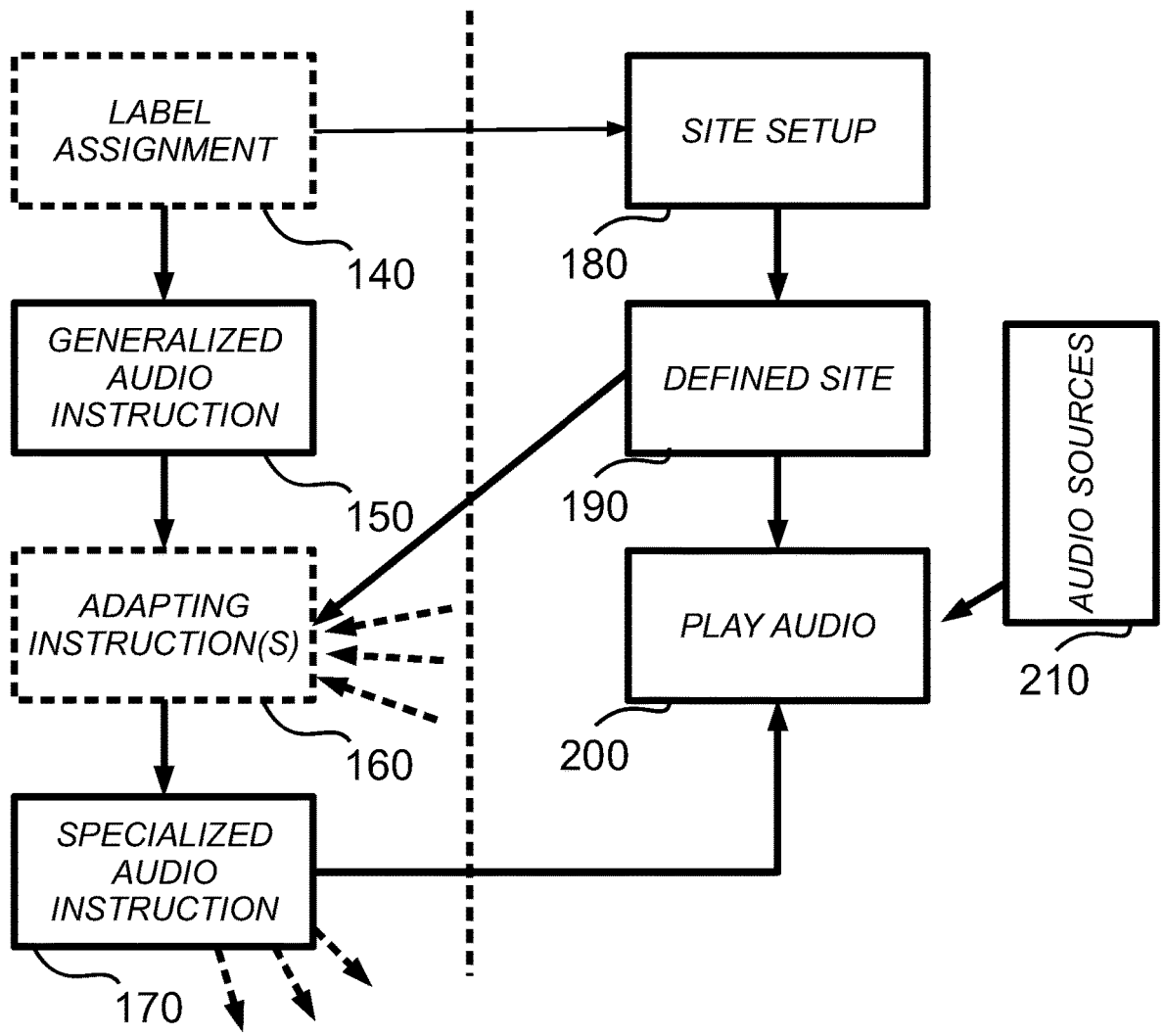
FIG. 3 is a flow chart showing an alternative embodiment.

FIG. 3 is a schematic flow-chart illustrating the inventive method according to embodiments thereof. A set of labels is defined at the manager site 102 in step 140, and a generalized audio instruction, which includes a plurality labels from the defined set of lables, is received via user input in step 150. In step 160, pre-defined information which associates labels with client site specific data is accessed, and the generalized audio instruction is adapted or refined using the pre-defined information to generate specialized audio instructions for the client sites. The specialized audio instructions are then transmitted to the client site(s) 104 in step 170. In particular, each specialized audio instruction may be transmitted to the client site identified in the specialized audio instruction. The flow at the client site 104 starts with step 180 and the setup of the client site 140. In the setup, a selection of the labels defined in step 140 are populated with local data and preferences to generate the pre-defined information, and thus the site is defined, indicated as step 190. The pre-defined information is communicated to step 160 and used as input when adapting the generalized audio instructions, as mentioned above. The client site 104 will receive the specialized audio instruction and implement it in step 200, i.e., play audio according to the specialized audio instruction. This includes collecting audio files from the identified audio sources 210 and playing the collected audio files in the identified audio zone(s) according to the identified time schedule(s). As mentioned, apart from illustrating the sequence of events at the different sites, FIG. 3 also indicates some relationalships, namely how the label assignment is utilized in the site setup and how the particulars of the defined site are communicated to the location where the local adaptation is performed, i.e., where the specialized audio instructions are generated. The step of adapting instructions is drawn with a hatched line since its location in the flow is not necessarily where it is arranged in the drawing. It could also be performed following a transmission of a stated schedule (a general schedule). Also, the step of assigning labels is shown in hatched line, since the labels are a feature that needs to be in place for the setup, but it is not a step that has to be performed in the actual distribution of audio.

It is to be understood that steps 140, 150, 160, 170 can be carried out by a device at the manager site 102. That device may include circuitry adapted to implement these steps. In a software implementation, the circuitry may be in the form of a central processing unit which is adapted to execute computer code instructions stored in a non-transitory computer-readable medium. These computer code instructions may be adapted to cause the central processing unit to execute method steps 140, 150, 160, 170. Hardware implementations of the device are also possible. In that case the device may include dedicated circuitry, such as application specific integrated circuits, for implementing each of steps 140, 150, 160, 170. Combinations of software and hardware implementations may also be envisaged, where some of the steps are implemented in software and others in hardware.

Being able to prepare a generalized audio instruction for a group of sites, and allowing for that generalized instruction to be transformed to a tailormade playlist has several benefits.

The invention claimed is:

1. A method for distributing an audio instruction from a manager site to one or more sites in a distributed audio system having a plurality of client sites, the method comprising:

receiving, via a user input at the manager site, a generalized audio instruction for playback of audio at the one or more sites of the plurality of client sites, each site of the one or more sites comprising one or more speakers, wherein the generalized audio instruction includes a plurality of labels that are global in the distributed audio system and are indicative of:

a time schedule category of time schedules defining when to play the audio at the one or more sites, an audio zone category identifying one or more audio zones for the one or more speakers to play the audio, and an audio source category identifying an audio category to play at the one or more sites;

accessing, for each site of the one or more sites, locally assembled pre-defined information that includes a table that associates the plurality of labels that are indicative of the time schedule category, the audio zone category, and the audio source category with one or more client site specific identifiers of a time schedule to play the audio at the one or more sites, an audio zone of the one or more speakers for each site, and an audio source from which one or more audio files are collected, respectively;

adapting the generalized audio instruction by co-processing the generalized audio instruction with the pre-defined information to generate a specialized audio instruction for each site of the one or more sites, wherein the specialized audio instruction for a client site includes a corresponding client site specific identifiers according to the locally assembled pre-defined information for the client site that are associated with the plurality of labels in the generalized audio instruction, and implementing, at each site of the one or more sites, the specialized audio instruction generated.

2. The method of claim 1, wherein the plurality of labels in the generalized audio instruction comprise a label indicative of a client site category, and wherein the pre-defined information associates the label with the one or more sites, and the method further comprising:
identifying, by using the pre-defined information, that audio is playing back at the one or more sites that are associated with the label.

3. The method of claim 2, wherein the pre-defined information associates the label with multiple client sites of the plurality of client sites based on a common parameter.

4. The method of claim 1, wherein the generation of the specialized audio instruction is performed at the manager site.

5. The method of claim 1, wherein the generation of the specialized audio instruction is fully or partly performed at the one or more sites.

6. The method of claim 1, wherein the client site specific identifier of an audio zone comprises one or more audio zones, each audio zone comprising local addresses to multiple speaker groups, and wherein each audio zone of the one or more audio zones is associated with a label indicative of an audio zone category.

7. The method of claim 1, further comprising:
defining a set of labels that are global in the distributed audio system and indicative of time schedule categories, audio zone categories, and audio source categories, wherein the plurality of labels in the generalized audio instruction is a sub-set of the set of labels, generating the pre-defined information by, for each client site in the distributed audio system, associating the set of labels indicative of time schedule categories, audio zone categories, audio source categories with client site specific identifiers of time schedules, audio zones, and audio sources, respectively.

8. The method of claim 7, wherein the labels in the set of labels are further indicative of client site categories, and wherein, in the step of generating the pre-defined information, each label indicative of a client site category is associated with one or more client site identifiers.

9. The method of claim 7, wherein the set of labels is defined at the manager site.

10. The method of claim 1, wherein the generalized audio instruction is sifted through a local filter adjusting the generalized audio instruction to a tailormade, specialized, audio instruction for the one or more client sites.

11. The method of claim 1, wherein the time schedule comprises a time stamp in relation to working hours corresponding to each client site of the one or more client sites the client site to enable implementing the specialized audio instruction generated for each client site of the one or more client sites with respect to corresponding local hours and time zones.

12. A device for distributing an audio instruction from a manager site to a client site in a distributed audio system having a plurality of client sites, comprising:
circuitry configured to:
receive, via a user input at the manager site, a generalized audio instruction for playback of audio at the one or more sites of the plurality of client sites, each site of the one or more sites comprising one or more speakers, wherein the generalized audio instruction includes a plurality of labels that are global in the distributed audio system and are indicative of:
a time schedule category of time schedules defining when to play the audio at the one or more sites,
an audio zone category identifying one or more audio zones for the one or more speakers to play the audio, and
an audio source category identifying an audio category to play at the one or more sites;
access, for each site of the one or more sites, locally assembled pre-defined information that includes a table that associates the plurality of labels, that are indicative of the time schedule category, the audio zone category, and the audio source category with one or more client site specific identifiers of a time schedule to play the audio at the one or more sites, an audio zone of the one or more speakers for each site, and an audio source from which one or more audio files are collected, respectively;
adapt the generalized audio instruction by co-processing the generalized audio instruction with the pre-defined information to generate a specialized audio instruction for each site of the one or more sites, wherein the specialized audio instruction for a client site includes a corresponding client site specific identifiers according to the locally assembled pre-defined information for the client site that are associated with the plurality of labels in the generalized audio instruction, and
transmit, to each site of the one or more sites, the specialized audio instruction generated.

13. The device of claim 12, wherein the plurality of labels in the generalized audio instruction comprise a label indicative of a client site category, and wherein the pre-defined information associates the label with the one or more sites, and the circuitry is further configured to:
identify, by using the pre-defined information, that audio is playing back at the one or more client sites that are associated with the label.

14. The device of claim 13, wherein the pre-defined information associates the label with multiple client sites of the plurality of client sites based on a common parameter.

15. The device of claim 13, wherein the generation of the specialized audio instruction is performed at the manager site.

16. The device of claim 12, wherein the generation of the specialized audio instruction is fully or partly performed at the one or more sites.

17. The device of claim 12, wherein the client site specific identifier of an audio zone comprises one or more audio zones, each audio zone comprising local addresses to multiple speaker groups, and wherein each audio zone of the one or more audio zones is associated with a label indicative of an audio zone category.

18. The device of claim 12, wherein the circuitry is further configured:

define a set of labels that are global in the distributed audio system and indicative of time schedule categories, audio zone categories, and audio source categories, wherein the plurality of labels in the generalized audio instruction is a sub-set of the set of labels, generate the pre-defined information by, for each client site in the distributed audio system, associating the set of labels indicative of time schedule categories, audio zone categories, audio source categories with client site specific identifiers of time schedules, audio zones, and audio sources, respectively.

19. The device of claim 18, wherein the labels in the set of labels are further indicative of client site categories, and wherein in generating the pre-defined information, each label indicative of a client site category is associated with one or more client site identifiers.

20. The device of claim 19, wherein the set of labels is defined at the manager site.

\* \* \* \* \*